United States Patent
Aoyagi (10) Patent No.: US 11,674,465 B2
(45) Date of Patent: Jun. 13, 2023

(54) COMBUSTION SYSTEM

(71) Applicant: DENSO CORPORATION, Kariya (JP)

(72) Inventor: Kenji Aoyagi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/895,571

(22) Filed: Aug. 25, 2022

(65) Prior Publication Data

US 2022/0403794 A1 Dec. 22, 2022

Related U.S. Application Data

(63) Continuation of application No. PCT/JP2021/005020, filed on Feb. 10, 2021.

(30) Foreign Application Priority Data

Feb. 27, 2020 (JP) .............................. JP2020-032207

(51) Int. Cl.
| | |
|---|---|
| *F02D 41/38* | (2006.01) |
| *F02D 41/14* | (2006.01) |
| *F02P 5/152* | (2006.01) |

(52) U.S. Cl.
CPC ......... *F02D 41/1497* (2013.01); *F02D 41/38* (2013.01); *F02P 5/152* (2013.01); *F02D 2041/389* (2013.01)

(58) Field of Classification Search
CPC ...... F02D 41/1497; F02D 41/38; F02D 41/34; F02D 2041/389; F02D 43/00; F02D 45/00; F02P 5/152; F02M 61/10; F02M 61/18

USPC ..... 123/299, 300, 305, 435, 406.16, 406.29, 123/406.37; 701/103-105, 111
See application file for complete search history.

(56) References Cited

U.S. PATENT DOCUMENTS

| | | | |
|---|---|---|---|
| 2001/0015192 A1 | 8/2001 | Urushihara et al. | |
| 2002/0078919 A1 | 6/2002 | Yasuoka et al. | |

FOREIGN PATENT DOCUMENTS

| | | |
|---|---|---|
| JP | 2002-242738 | 8/2002 |
| JP | 2011-241753 | 12/2011 |
| JP | 2016-037892 | 3/2016 |

*Primary Examiner* — Hai H Huynh
(74) *Attorney, Agent, or Firm* — Nixon & Vanderhye P.C.

(57) ABSTRACT

A normal control unit performs a normal control to cause an injection apparatus to perform predetermined normal injection and subsequently cause an ignition plug to perform ignition. In a delay region in a combustion chamber, propagation of flame is retarded further than in another region when the normal control is performed. In a knock state, self-ignition occurs in the delay region when the normal control is performed. When the knock state is established, an adjustment control unit performs, to suppress the self-ignition, an adjustment control to perform main injection and subsequently perform sub-injection in a second half of a compression stroke to adjust a fuel distribution in the combustion chamber to facilitate propagation of flame to the delay region further than in the normal control and subsequently cause the ignition plug to perform the ignition.

14 Claims, 7 Drawing Sheets

(a) NORMAL CONTROL (b) ADJUSTMENT CONTROL (c) RETARD CONTROL

COMBUSTION SYSTEM

CROSS REFERENCE TO RELATED APPLICATION

The present application is a continuation application of International Patent Application No. PCT/JP2021/005020 filed on Feb. 10, 2021, which designated the U.S. and claims the benefit of priority from Japanese Patent Application No. 2020-032207 filed on Feb. 27, 2020. The entire disclosures of all of the above applications are incorporated herein by reference.

TECHNICAL FIELD

The present disclosure relates to a combustion system.

BACKGROUND

Conventionally, an internal combustion engine is equipped with a lean burn combustion system to cause lean burn in a combustion chamber.

SUMMARY

According to an aspect of the present disclosure, a combustion system comprises an injection apparatus configured to inject fuel into a combustion chamber of an engine; and an ignition plug configured to perform ignition on the fuel in the combustion chamber.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, examples of the present disclosure will be described.

A fuel system according to an example of the present disclosure is configured to prevent knock as follows. Specifically, in an intake stroke, main injection is performed to form a mixed gas at a lean air-fuel ratio in an entire combustion chamber and, in a first half of a subsequent compression stroke, sub-injection is performed to form a mixed gas at a rich air-fuel ratio in the vicinity of an ignition plug. Thus, the mixed gas at the rich air-fuel ratio is formed in the vicinity of the ignition plug, while an exhaust-side region is maintained at the lean air-fuel ratio. In this manner, self-ignition in the exhaust-side region where a temperature is higher is suppressed to suppress knock.

The sub-injection is performed in the first half of the compression stroke, and consequently the fuel injected by the sub-injection is likely to be widely diffused immediately before ignition. In this configuration, it may be difficult to adjust a fuel distribution in the combustion chamber immediately before the ignition to an intended fuel distribution. As a result, it may be difficult to precisely suppress the knock. In addition, this issue may be particularly noticeable during high revolution of an engine during which an air flow in the combustion chamber is intense.

A combustion system according to an example of the present disclosure comprises an injection apparatus configured to inject fuel into a combustion chamber of an engine; an ignition plug configured to perform ignition on the fuel in the combustion chamber; and a normal control unit configured to perform a normal control to cause the injection apparatus to perform predetermined normal injection and subsequently to cause the ignition plug to perform the ignition.

Hereinafter, in a predetermined delay region in the combustion chamber, propagation of flame is retarded compared to another region when the normal control is performed. Hereinafter, in a knock state, self-ignition occurs in the fuel in the delay region when the normal control is performed.

The combustion system further comprises an adjustment control unit configured to perform, when the knock state is established, a predetermined adjustment control to suppress the self-ignition. The adjustment control is to cause the injection apparatus to perform predetermined main injection and further perform predetermined sub-injection in a second half of a subsequent compression stroke to adjust a fuel distribution in the combustion chamber to facilitate propagation of the flame to the delay region further than in the normal injection, and subsequently cause the ignition plug to perform the ignition.

In the adjustment control in the present disclosure, the main injection is performed, and the sub-injection is also performed to adjust the fuel distribution in the combustion chamber to a fuel distribution which facilitates propagation of the flame to the delay region, and then ignition is performed. In other words, rather contrary to the idea of the background technology described above, which controls the region where the self-ignition is intended to be suppressed to the lean air-fuel ratio, the adjustment control in the present disclosure facilitates propagation of the flame to the delay region where the self-ignition is intended to be suppressed. By the propagation of the flame to the delay region, the self-ignition in the delay region is suppressed to suppress knock. In addition, in the adjustment control in the present disclosure, the sub-injection is performed in the second half of the compression stroke. As a result, the fuel distribution in the combustion chamber immediately before the ignition is more easily controlled as intended than with the background technology which performs the sub-injection in the first half of the compression stroke. This facilitates precise suppression of the knock.

Referring to the drawings, a description will be given below of embodiments of the present disclosure. Note that the present disclosure is not limited to the embodiments, and can be implemented by being appropriately modified within a scope not departing from the gist of the present disclosure.

First Embodiment

Figure 1:
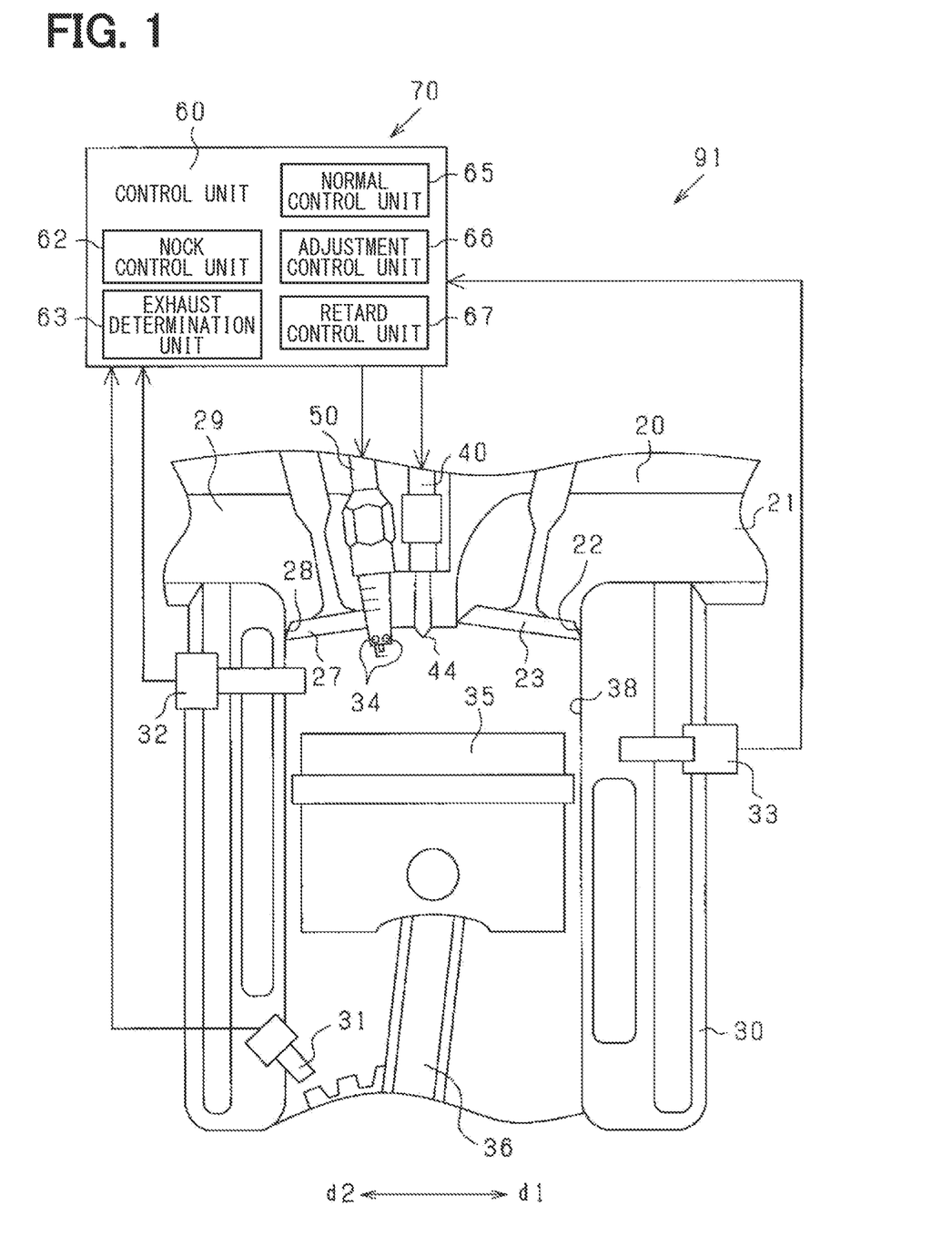
FIG. 1 is a front cross-sectional view illustrating a combustion system of a first embodiment.
Figure 2:
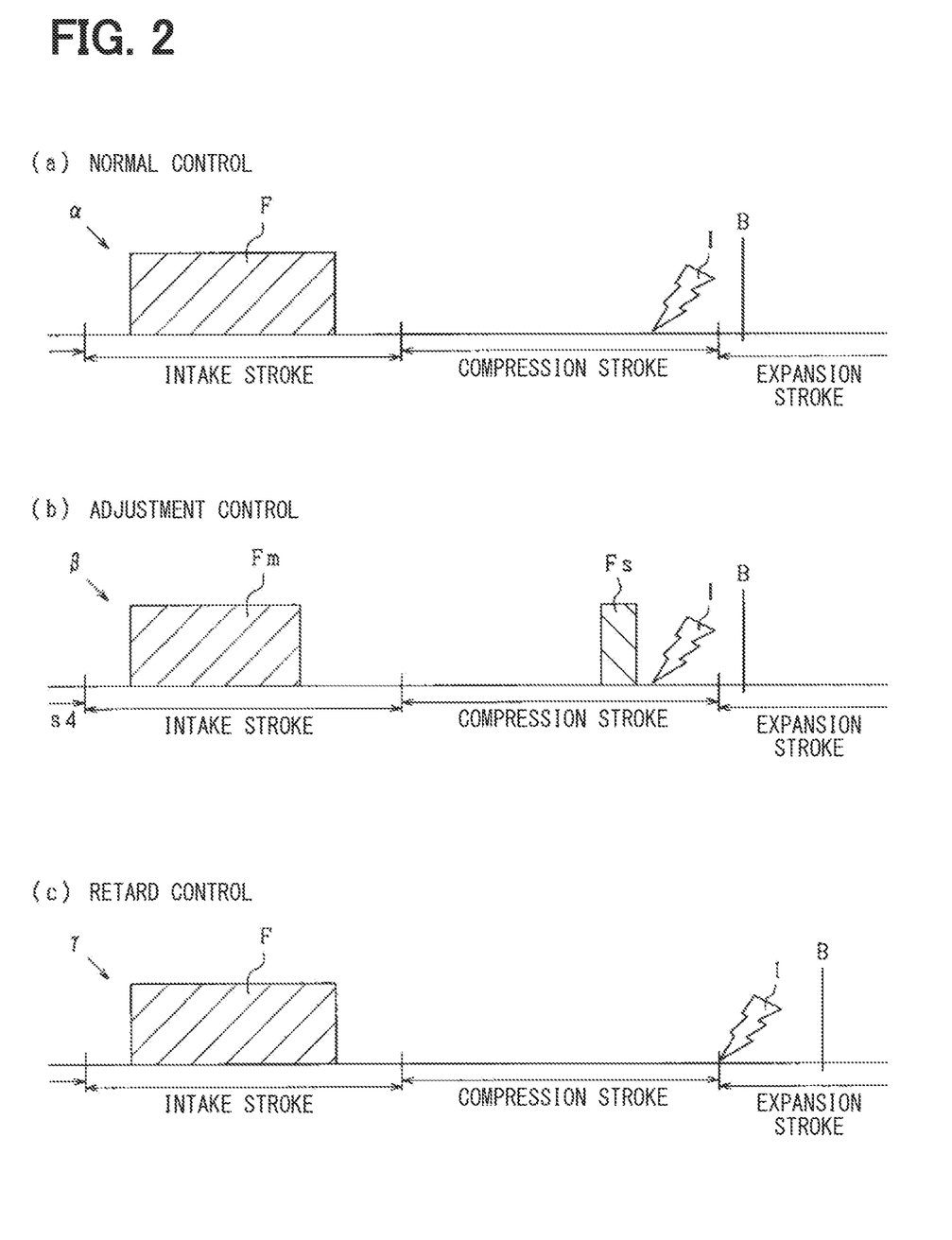
FIG. 2 is a time chart illustrating normal control, adjustment control, and retard control.

First, a description will be given of an outline of the present embodiment. As illustrated in FIG. 1, a combustion system 70 is disposed with respect to an engine 91. The combustion system 70 includes an injection apparatus 40, an ignition plug 50, and a control unit 60. The injection apparatus 40 injects a fuel into a combustion chamber 38 of the engine 91. The ignition plug 50 performs ignition I on the fuel in the combustion chamber 38. The control unit 60 includes a normal control unit 65, an adjustment control unit 66, and a retard control unit 67. The normal control unit 65 performs normal control α illustrated in FIG. 2(a). In the normal control α, the injection apparatus 40 performs predetermined normal injection F, and then the ignition plug 50 performs the ignition I.

Figure 3:
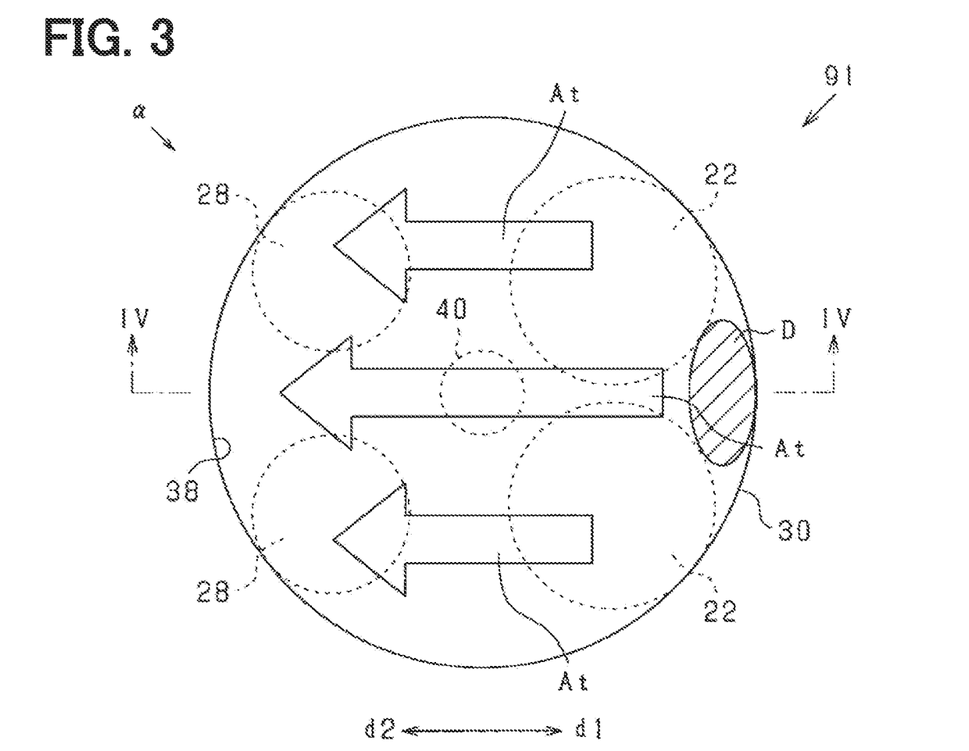
FIG. 3 is a plan cross-sectional view illustrating the inside of a combustion chamber immediately after ignition during the normal control.
Figure 4:
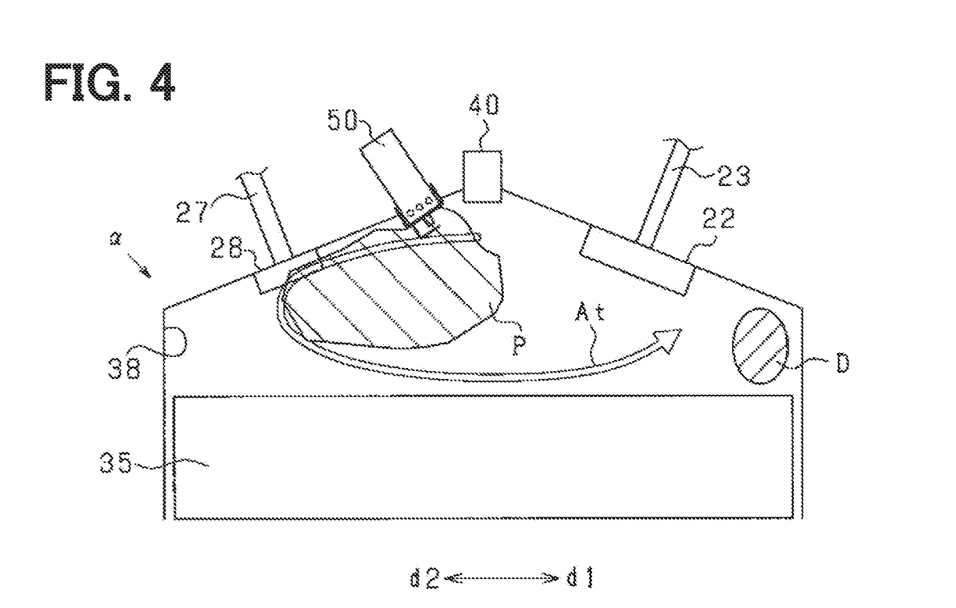
FIG. 4 is a front cross-sectional view illustrating a cross section along a line IV-IV in FIG. 3.

FIGS. 3 and 4 illustrate the inside of the combustion chamber 38 immediately after the ignition during execution of the normal control α. It is assumed hereinbelow that a predetermined region in the combustion chamber 38 where, when the normal control α is performed, propagation of flame P is retarded compared to that in another portion is a "delay region D", and a state in which, when the normal control α is performed, self-ignition occurs in the fuel in the delay region D is a "knock state". It is also assumed hereinbelow that a direction from an exhaust port 28 of the engine 91 toward an inlet port 22 thereof is an "intake direction d1", and a direction opposite to the intake direction d1 is an "exhaust direction d2".

As illustrated in FIGS. 3 and 4, the engine 91 in the present embodiment has a configuration in which, in at least a predetermined state, a tumble At generated in an intake stroke is sustained until a second half of a compression stroke to form the delay region D on an intake direction d1 side of the combustion chamber 38a center relative to a center thereof.

Figure 5:
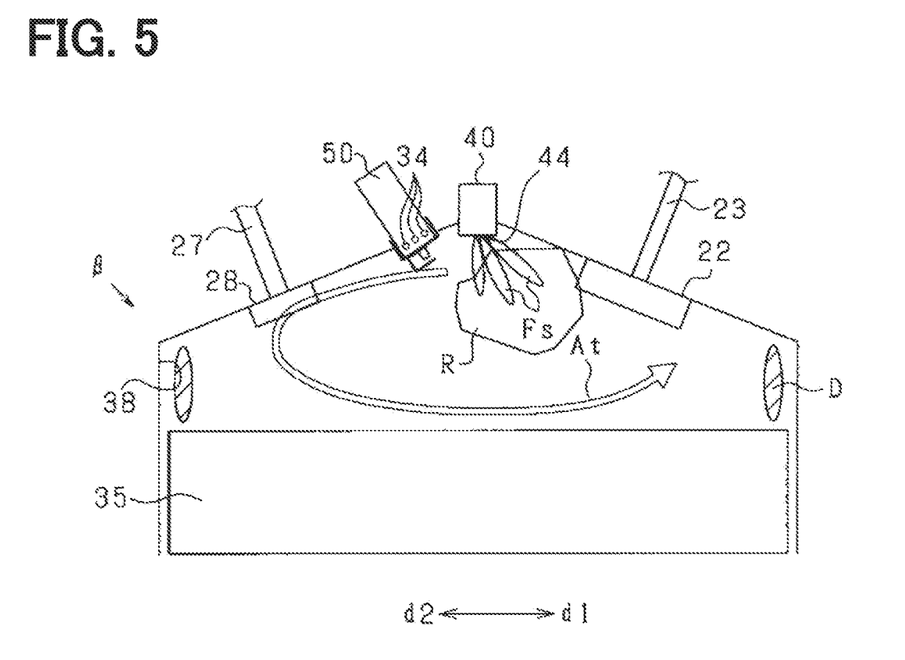
FIG. 5 is a front cross-sectional view illustrating the inside of the combustion chamber immediately before the ignition during the adjustment control.

As illustrated in FIG. 5, the injection apparatus 40 is configured to inject a larger amount of the fuel on the intake direction d1 side than on an exhaust direction d2 side. In the injection apparatus 40, an injection hole 44 having an atomization structure for atomizing the fuel and injecting the atomized fuel is provided. The atomization structure includes at least either one of a widening structure which widens in a tapered form or a stepwise configuration with advance on an injection direction side and an oval structure having an oval opening.

Figure 6:
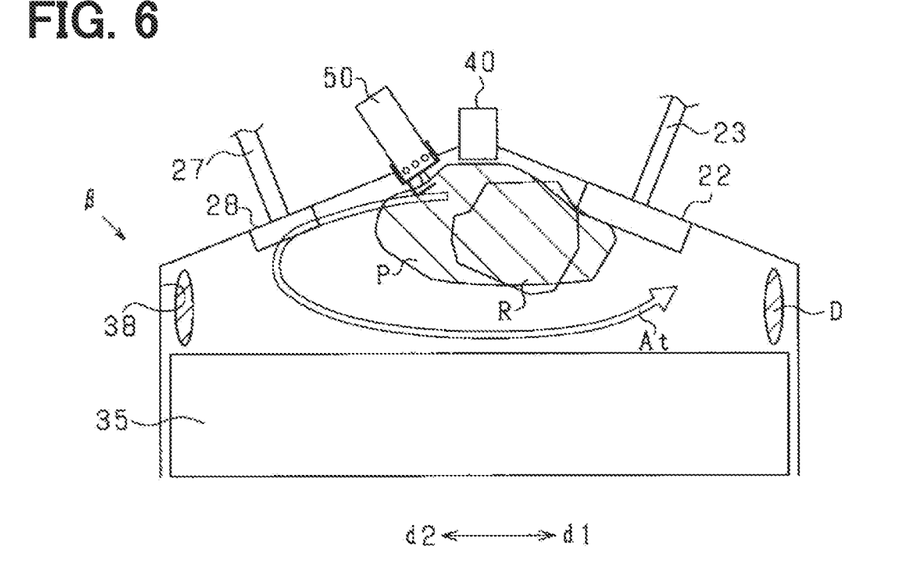
FIG. 6 is a front cross-sectional view illustrating the inside of the combustion chamber immediately after the subsequent ignition.

When the knock state is established, the adjustment control unit 66 performs adjustment control β illustrated in (b) in FIG. 2 to suppress the self-ignition. In the adjustment control β, the injection apparatus 40 performs predetermined main injection Fm, and also performs predetermined sub-injection Fs in the second half of the subsequent compression stroke. Thus, as illustrated in FIG. 5, a fuel distribution in the combustion chamber 38 is adjusted to a fuel distribution which facilitates propagation of the flame P to the delay region D than in a case where the normal injection F is performed. In the fuel distribution state, as illustrated in FIG. 6, the ignition plug 50 performs the ignition I.

As illustrated in FIG. 5 or the like, the combustion system 70 has electromagnetic sensors 34 that detect an electromagnetic wave generated in the combustion chamber 38. There is the plurality of electromagnetic sensors 34 which are provided side by side on an outer peripheral surface of the ignition plug 50 to be spaced apart from each other in a circumferential direction. The adjustment control unit 66 detects, on the basis of the electromagnetic wave detected by the electromagnetic sensors 34, delay region information which is information related to the delay region D, and performs the adjustment control β on the basis of the delay region information.

The adjustment control unit 66 controls, on the basis of an intensity of an air flow in the combustion chamber 38, a sub-injection pressure which is an injection pressure in the sub-injection Fs. Specifically, when the intensity of the air flow is higher than that when the intensity of the air flow is a predetermined intensity, the adjustment unit 66 controls the sub-injection pressure such that the sub-injection pressure increases.

The retard control unit 67 performs retard control γ illustrated in FIG. 2(c). The retard control γ is control in which timing of the ignition I is later than that in each of the normal control α and the adjustment control β.

As illustrated in FIG. 1, the control unit 60 further includes a knock determination unit 62 and an exhaust determination unit 63. The knock determination unit 62 determines whether or not the knock state is established. The exhaust determination unit 63 determines whether or not an exhaust state falls within a predetermined allowable range even when the adjustment control β is performed. Specifically, the exhaust determination unit 63 computes an amount of emission of CO (carbon monoxide) which is emitted when the adjustment control β is performed, and determines that, even when the adjustment control β is performed, the exhaust state falls within the predetermined allowable range on the condition that the computed amount of the CO emission is smaller than a predetermined CO tolerance threshold. The exhaust determination unit 63 further computes an amount of emission of PM (particulate substance) which is emitted when the adjustment control β is performed, and determines that, even when the adjustment control β is performed, the exhaust state falls within the predetermined allowable range on the condition that the computed amount of the PM emission is smaller than a predetermined PM tolerance threshold.

In a case where it is determined by the knock determination unit 62 that the knock state is not established, the control unit 60 performs the normal control α illustrated in (a) in FIG. 2. Meanwhile, in a case where it is determined by the knock determination unit 62 that the knock state is established and it is determined by the exhaust determination unit 63 that the exhaust state falls within the allowable range even when the adjustment control β is performed, the control unit 60 performs the adjustment control β illustrated in (b) in FIG. 2. Meanwhile, in a case where it is determined by the knock determination unit 62 that the knock state is established and it is determined by the exhaust determination unit 63 that the exhaust state does not fall within the allowable range when the adjustment control β is performed, the control unit 60 performs the retard control γ illustrated in (c) in FIG. 3.

A description will be given of details of the present embodiment.

FIG. 1 is a cross-sectional view illustrating the combustion system 70 in the first embodiment and the vicinity thereof. The engine 91 is a 4-stroke engine in which one combustion cycle includes four strokes which are the intake stroke, the compression stroke, an expansion stroke, and an exhaust stroke. The engine 91 has a cylinder 30 and a head 20 attached to an upper portion thereof.

A description will be given hereinbelow according to the drawing on the assumption that a length direction of a center line of the cylinder 30 is a vertical direction. However, the engine 91 and the combustion system 70 can be disposed in any direction such that, e.g., the engine 91 and the combustion system 70 are disposed with the center line being oblique to the vertical direction or that the engine 91 and the combustion system 70 are disposed with the center line oriented in a horizontal direction.

In the cylinder 30, a piston 35 is disposed. The piston 35 is connected to a crankshaft (the illustration of which is omitted) via a link 36 to vertically move with rotation of the crankshaft. Above the piston 35, the combustion chamber 38 is formed.

The head 20 is provided with an intake passage 21 for sucking a gas into the combustion chamber 38 and with an exhaust passage 29 for exhausting the gas from inside the combustion chamber 38. An opening of the intake passage 21 in the combustion chamber 38 forms the intake port 22, while an opening of the exhaust passage 29 in the combustion chamber 38 forms the exhaust port 28.

Then, in the intake passage 21, an intake valve 23 is disposed while, in the exhaust passage 29, an exhaust valve 27 is disposed. The intake valve 23 is driven by an intake cam (the illustration of which is omitted), while the exhaust valve 27 is driven by an exhaust cam (the illustration of which is omitted). In addition, at a portion of the head 20 located at a center portion of a ceiling portion of the combustion chamber 38, the injection apparatus 40 and the ignition plug 50 are disposed.

In the engine 91, a crank angle sensor 31, an inner pressure sensor 32, and a vibration sensor 33 are disposed. The crank angle sensor 31 detects a rotation angle of the crankshaft. The inner pressure sensor 32 detects a pressure in the combustion chamber 38. The vibration sensor 33 detects vibration generated in the engine 91.

The electromagnetic sensor 34 is provided on a lower end portion of the ignition plug 50 in the combustion chamber 38. The electromagnetic sensor 34 may be, e.g., a sensor that detects a visible light beam, i.e., an optical sensor that detects a wavelength of chemiluminescence or the like or an infrared sensor that detects an infrared ray. When the electromagnetic sensor 34 is the optical sensor, the adjustment control unit 66 detects, on the basis of, e.g., the visible light beam detected by the electromagnetic sensor 34, i.e., the wavelength of the detected chemiluminescence or the like, combustion information which is information related to combustion and detects, on the basis of the combustion information, the delay region information. In that case, the adjustment control unit 66 detects (estimates), on the basis of the combustion information before previous combustion, the delay region information immediately before the current ignition. Examples of the delay region information include a location of the delay region D, timing of generation of the delay region D, ease of occurrence of the self-ignition in the delay region D, and the like.

When the electromagnetic sensor 34 is the infrared sensor, the adjustment control unit 66 detects, on the basis of, e.g., the infrared ray detected by the electromagnetic sensor 34, distribution information which is information related to a distribution of the fuel and detects, on the basis of the distribution information, the delayed region information. In that case, the adjustment control unit 66 detects, on the basis of, e.g., the current distribution information, the current delay region information.

The knock determination unit 62 may perform knock determination on the basis of, e.g., a result of detection of the vibration by the vibration sensor 33, or may also perform the knock determination on the basis of a result of detection of an electromagnetic wave by the electromagnetic sensor 34. Alternatively, the knock determination unit 62 may also perform the knock determination on the basis of various parameters such as, e.g., revolutions of the engine 91, a load, and a water temperature, or may also perform comprehensive knock determination on the basis also of fuel property determination that determines a property of the fuel in addition to those various parameters.

The computation of the amount of the PM emission in the exhaust determination unit 63 may also be, e.g., computation of the number of emitted PM particles (PN) or computation of a mass of the emitted PM.

(a) in FIG. 2 is a time chart illustrating the normal control α performed by the normal control unit 65. The normal injection F injects, in the intake stroke, all of the fuel to be injected in one combustion cycle, i.e., all of the fuel required to achieve a theoretical air-fuel ratio in the combustion chamber 38. Injection I is performed at the end of the compression stroke.

(b) in FIG. 2 is a time chart illustrating the adjustment control β performed by the adjustment control unit 66. In the main injection Fm, the fuel to be injected in one combustion cycle, i.e., a major part of the fuel required to achieve the theoretical air-fuel ratio in the combustion chamber 38 except for a part thereof is injected and, in the sub-injection Fs, the remaining part is injected. The ignition I is performed at the end of the compression stroke.

(c) in FIG. 2 is a time chart illustrating the retard control γ performed by the retard control unit 67. In the same manner as in the case of the normal control α, the normal injection F is performed. Then, the injection I is performed at timing later than the ignition timing in each of the normal control α and the adjustment control β. The timing of the ignition I may be at the end of the compression stroke, at a compression top dead center, or in a first half of the expansion stroke.

The adjustment control β illustrated in (b) in FIG. 2 is superior to the retard control γ illustrated in (c) in FIG. 2 in that a torque reduction from a torque in the normal control α illustrated in (a) in FIG. 2 is smaller than that in the retard control illustrated in (c) in FIG. 2. The following will describe a reason for such a smaller torque reduction. It is assumed hereinbelow that timing of reaching a state in which 50% of the fuel in the fuel chamber 38 is burnt is referred to as a "combustion gravity center B". When the combustion gravity center B is a predetermined optimum combustion gravity center (e.g., 10 crank angles after the compression top dead center), a highest torque can be obtained. Then, in the normal control α illustrated in (a) in FIG. 2, the combustion gravity center B is controlled to be the optimum combustion gravity center. Meanwhile, in the retard control γ illustrated in (c) in FIG. 2, as a result of retarding the ignition I, the combustion gravity center B is lagging behind the optimum combustion gravity center. In the adjustment control β illustrated in (b) in FIG. 2 also, the combustion gravity center B is slightly lagging behind the optimum combustion gravity center. However, the lag is not so large as in the case of the retard control γ. Consequently, in the adjustment control β, the torque reduction from the torque in the normal control α is smaller than that in the retard control γ.

However, the adjustment control β has a problem in that an amount of emission of PM or CO is likely to increase. This is because, in the adjustment control β, a time period from the sub-injection Fs to the ignition I, i.e., a time period for evaporation of the fuel injected in the sub-injection Fs tends to be insufficient. Therefore, as described above, it is chosen whether the adjustment control β is to be performed or the retard control γ is to be performed on the basis of the determination by the exhaust determination unit 63.

FIG. 3 is a plan cross-sectional view illustrating the inside of the combustion chamber 38 immediately after the ignition during the execution of the normal control α, and FIG. 4 is a cross-sectional view illustrating a cross section along a line IV-IV in FIG. 3.

In the present embodiment, even during high revolution of the engine 91 or the like, the tumble At generated in the intake stroke in the combustion chamber 38 is sustained until the second half of the compression stroke. As illustrated in FIG. 4, the tumble At is an annular flow flowing in the exhaust direction d2 in an upper part of the combustion chamber 38, while flowing in the intake direction d1 in a lower part of the combustion chamber 38. Due to the tumble At, spreading of the flame P on the exhaust direction d2 side is faster, while the spreading thereof in the intake direction d1 is slower. Consequently, arrival of the flame P at an end portion in the intake direction d1 in the combustion chamber 38 is retarded to generate the delay region D in the end portion in the intake direction d1. However, unless the knock state described above is reached, the normal control α is performed.

FIG. 5 is a front cross-sectional view illustrating the inside of the combustion chamber 38 before the ignition during execution of the adjustment control β. A center line of the injection hole 44 faces more toward the intake direction d1 side than directly downward. Accordingly, by the sub-injection Fs, a rich region R as a region at a rich air-fuel ratio widely expands on the intake direction d1 side from the injection apparatus 40. Due to the rich region R expanding on the intake direction d1 side, the fuel distribution in the combustion chamber 38 becomes a fuel distribution which facilitates propagation of the flame P to the delay region D.

In the state of the fuel distribution, when the ignition plug 50 ignites the fuel as illustrated in FIG. 6, the rich region R accelerates the propagation of the flame P in the intake direction d1 to quickly spread the flame P in the intake direction d1. Meanwhile, the spreading of the flame P in the exhaust direction d2 is slightly retarded since a main injection amount as an amount of injection in the main injection Fm is reduced by a sub-injection amount compared to the main injection amount in the normal injection F in the normal control α. Consequently, the flame P is likely to evenly spread in the intake direction d1 and in the exhaust direction d2. As a result, a delay in the propagation of the flame P to the delay region D is suppressed. This suppresses the self-ignition in the delay region D and inhibit occurrence of the knock.

Figure 7:
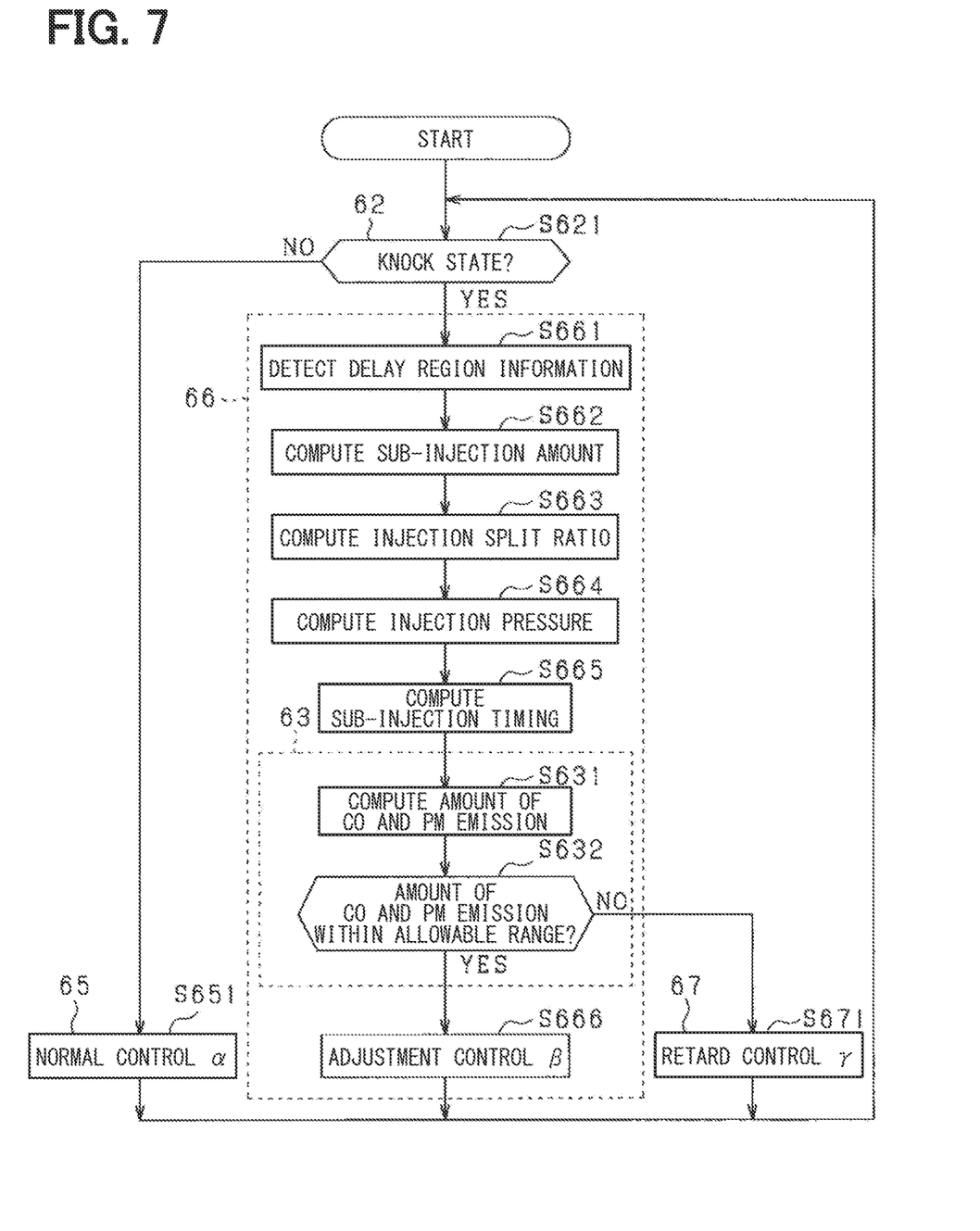
FIG. 7 is a flow chart illustrating control by the combustion system.

FIG. 7 is a flow chart illustrating control by the control unit 60. In the following, S621 corresponds to a function of the knock determination unit 62, and S631 to S632 correspond to a function of the exhaust determination unit 63. Also, in the following, S651 corresponds to a function of the normal control unit 65, S661 to S666 correspond to a function of the adjustment control unit 66, and S671 corresponds to a function of the retard control unit 67.

In the control illustrated in FIG. 7, first, the knock determination unit 62 makes a knock determination to determine whether or not the knock state is established (S621). When it is determined that the knock state is not established (NO in S621), the normal control unit 65 performs the normal control α (S651).

Meanwhile, when it is determined that the knock state is established in S621 (YES in S621), the adjustment control unit 66 gives consideration to the adjustment control β (S661 to S664, S631 to S632). Specifically, first, the delay region information is detected on the basis of the electromagnetic wave detected by the electromagnetic sensor 34 (S661). Then, on the basis of the delay region information, the sub-injection amount required to suppress the self-ignition is computed (S662). Then, on the basis of the sub-injection amount, a ratio of the sub-injection amount to a total amount of injection given within one combustion cycle and the main injection amount are computed (S663). Then, a flow state in the combustion chamber 38 is computed and, on the basis of the flow state, the sub-injection pressure required to cause the sub-injection Fs to reach a target is computed (S664). Accordingly, control is performed such that, as the air flow in the combustion chamber 38 is intenser, the sub-injection pressure is higher. Then, on the basis of the sub-injection pressure and the flow state, a required time which is a time required for the fuel to reach the target is computed and, from the required time, sub-injection timing as timing of giving the sub-injection Fs is computed (S665).

Then, the exhaust determination unit 63 computes amounts of emission of CO and PM emitted when the sub-injection Fs is performed with the sub-injection amount, the sub-injection pressure, and the sub-injection timing (S631). Then, it is determined whether or not the computed amount of the CO emission is smaller than the CO tolerance threshold and the computed amount of the PM emission is smaller than the PM tolerance threshold (S632). When this condition is not satisfied (NO in S632), the adjustment control β cannot be performed, and therefore the retard control unit 67 performs the retard control γ (S671). Meanwhile, when the condition described above is satisfied (YES in S632), the adjustment control unit 66 performs the adjustment control β (S666).

Note that the computation of the sub-injection amount in S662 can be performed on the basis of, e.g., a map or a numerical expression representing a relationship between the delay region information and the sub-injection amount. The computation of the flow state in S664 can be performed on the basis of, e.g., a map or a numerical expression representing a relationship between a state in which the engine 91 is driven and the flow state. The computation of the sub-injection pressure in S664 can be performed on the basis of, e.g., a map or a numerical expression representing a relationship between the flow state and the sub-injection pressure. The computation of the required time in S665 can be performed on the basis of, e.g., a map or a numerical expression representing a relationship between each of the sub-injection pressure and the flow state and the required time. The amount of the CO emission in S631 can be computed on the basis of, e.g., a map or a numerical expression representing a relationship between the state in which the engine 91 is driven and the amount of the CO emission. The amount of the PM emission in S631 can be computed on the basis of, e.g., a map or a numerical expression representing a relationship between the state in which the engine 91 is driven and the amount of the PM emission.

According to the present embodiment, the following effect can be obtained. In the adjustment control β, the main injection Fm is performed and then the sub-injection Fs is performed in the second half of the compression stroke to adjust the fuel distribution in the combustion chamber 38 to the fuel distribution which allows easier propagation of the flame P to the delay region D, and then the ignition I is performed. In other words, rather contrary to the idea of the background technology described above, which controls a region where self-ignition is intended to be suppressed at a lean air-fuel ratio, the adjustment control β in the present embodiment facilitates the propagation of the flame P to the delay region D where the self-ignition is intended to be suppressed. By the propagation of the flame P to the delay region D, the self-ignition in the delay region D is suppressed to suppress the knock. Additionally, in the adjustment control β, the sub-injection Fs is performed in the second half of the compression stroke. As a result, compared to the background technology which performs the sub-injection in the first half of the compression stroke, it is easier to control the fuel distribution in the combustion chamber 38 immediately before the ignition as intended and precisely suppress the knock.

In addition, the adjustment control unit 66 detects the delay region information on the basis of the electromagnetic wave detected by the electromagnetic sensor 34, and performs the adjustment control β on the basis of the delay region information, i.e., on the basis of information such as the location of the delay region D, timing of generation of the delay region D, and ease of occurrence of the self-ignition in the delay region D. Therefore, it is possible to more precisely perform the adjustment control β than in a case where, e.g., the adjustment control β is performed not on the basis of the delay region information, but merely on the basis of, e.g., a result of knock determination or a knock intensity.

The electromagnetic sensor 34 includes a plurality of electromagnetic sensors which are provided side by side on the outer peripheral surface of the ignition plug 50 to be spaced apart from each other in the circumferential direction. This allows a configuration for detecting a required electromagnetic wave in the combustion chamber 38 to be efficiently formed.

In addition, the following effect can also be obtained. In the engine 91 in a form in which the tumble At generated in the intake stroke is sustained until the second half of the compression stroke as in the case of the present embodiment, the delay region D is formed on the intake direction d1 side of the combustion chamber 38 relative to the center thereof. In this respect, in the present embodiment, the injection apparatus 40 is configured to inject a larger amount of the fuel on the intake direction d1 side than on the exhaust direction d2 side. Therefore, it is possible to form the rich region R on the intake direction d1 side by the sub-injection Fs and facilitate efficient propagation of the flame P to the delay region D.

In addition, the combustion system 70 performs the adjustment control β or the retard control γ on the condition that it is determined by the knock determination unit 62 that the knock state is established. Consequently, it is possible to avoid execution of the adjustment control β or the delay control γ even when the execution thereof is unnecessary.

In addition, when it is determined that the knock state is established and it is determined that, even when the adjustment control β is performed, the exhaust state falls within the allowable range, the combustion system 70 performs the adjustment control β. As a result, it is possible to output a torque higher than that output when the retard control γ is performed. Meanwhile, when it is determined that the knock state is established and it is determined that, when the adjustment control β is performed, the exhaust state does not fall within the allowable range, the combustion system 70 performs the retard control γ. Therefore, it is possible to suppress the knock, while allowing the exhaust state to fall within the allowable range.

The exhaust determination unit 63 computes the amount of emission of CO emitted when the adjustment control β is performed, and determines that, even when the adjustment control β is performed, the exhaust state falls within the allowable range on the condition that the computed amount of the CO emission is smaller than the CO tolerance threshold. This can prevent the amount of the CO emission from exceeding the CO tolerance threshold.

In addition, the exhaust determination unit 63 computes the amount of emission of PM emitted when the adjustment control β is performed, and determines that, even when the adjustment control β is performed, the exhaust state falls within the allowable range on the condition that the computed amount of the PM emission is smaller than the PM tolerance threshold. This can prevent the amount of the PM emission from exceeding the PM tolerance threshold.

The adjustment control unit 66 increases the sub-injection pressure when the intensity of the air flow in the combustion chamber 38 is higher than that when the intensity of the air flow in the combustion chamber 38 is weak. As a result, even when the air flow in the combustion chamber 38 is intense, it is easier to implement an intended fuel distribution, and it is possible to facilitates propagation of the flame P to the delay region D.

In addition, the injection apparatus 40 is provided with the injection hole 44 having the atomization structure, and accordingly the fuel injected from the injection hole 44 is likely to have smaller particle diameters. As a result, it is possible to accelerate the evaporation of the fuel and efficiently reduce the amounts of the CO and PM emission.

Second Embodiment

Next, a description will be given of a second embodiment. In the following embodiments, members that are the same as or correspond to those in the previous embodiment and the like are denoted by the same reference numerals. However, the engine is denoted by a reference numeral differing from one embodiment to another. Of the present embodiment, a description will be given on the basis of the first embodiment with emphasis on a point different from that in the first embodiment.

Figure 8:
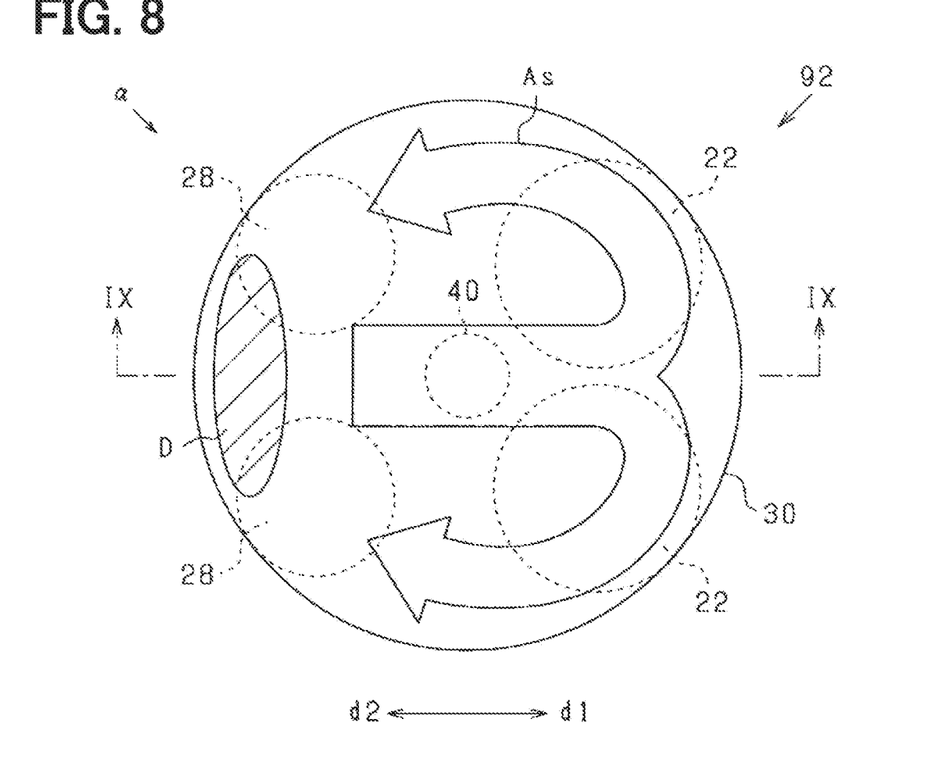
FIG. 8 is a plan cross-sectional view illustrating the inside of the combustion chamber immediately after the ignition during the normal control in a second embodiment.
Figure 9:
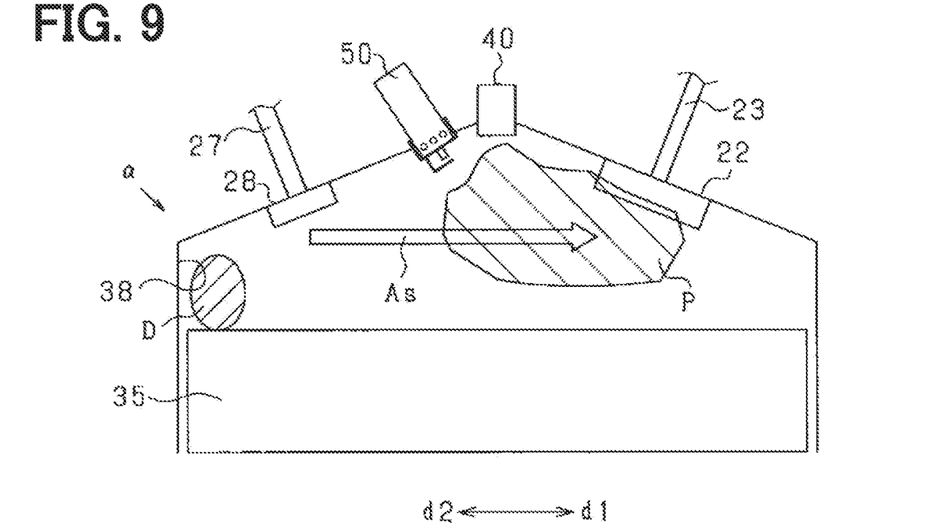
FIG. 9 is a front cross-sectional view illustrating a cross section along a line IX-IX in FIG. 8.
Figure 10:
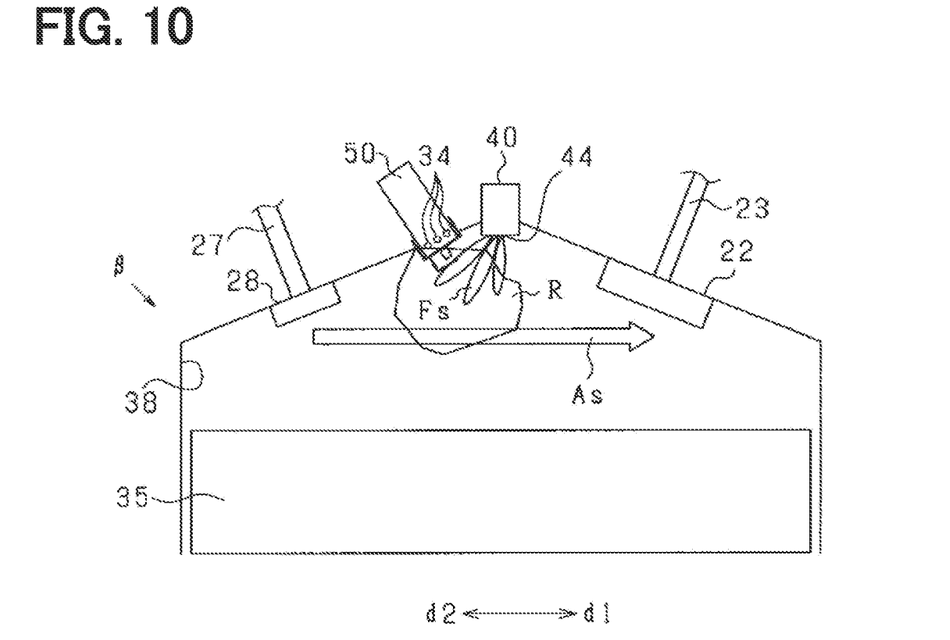
FIG. 10 is a front cross-sectional view illustrating the inside of the combustion chamber immediately before the ignition during the adjustment control.

First, a description will be given of an outline of the present embodiment. As illustrated in FIGS. 8 and 9, an engine 92 in the present embodiment has a configuration in which a tumble generated in the intake stroke changes to the swirl As in the compression stroke to form the delay region D on the exhaust direction d2 side of the combustion chamber 38 relative to the center thereof. As illustrated in FIG. 10, the injection apparatus 40 is configured to inject a larger amount of the fuel on the exhaust direction d2 side than on the intake direction d1 side.

Next, a description will be given of details of the present embodiment.

FIG. 8 is a plan cross-sectional view illustrating the inside of the combustion chamber 38 immediately after the ignition during the execution of the normal control α. FIG. 9 is a cross-sectional view illustrating a cross section along a line IX-IX in FIG. 8.

In the present embodiment, during the high revolution of the engine or the like, a horizontally extending rotation axis of the tumble generated in the intake stroke in the combustion chamber 38 is divided into two each facing the vertical direction in the compression stroke, resulting in generation of the ω swirl As. As illustrated in FIG. 8, the ω swirl As is a flow shaped like a letter "ω" in plan view which flows in the intake direction d1 in the center portion of the combustion chamber 38, while flowing in the exhaust direction d2 on both sides thereof. The ω swirl As accelerates the spreading of the flame P on the intake direction d1 side as illustrated in FIG. 9, while retarding the spreading thereof in the exhaust direction d2. As a result, arrival of the flame P at the end portion in the exhaust direction d2 in the combustion chamber 38 is retarded, and the delay region D is generated at the end portion in the exhaust direction d2. However, unless the knock state described above is reached, the normal control α is performed.

FIG. 10 is a front cross-sectional view illustrating the inside of the fuel combustion chamber 38 before the ignition during the execution of the adjustment control β. The center line of the injection hole 44 faces more toward the exhaust direction d2 side than directly downward. Accordingly, due to the sub-injection Fs, the rich region R as the region at the rich air-fuel ratio expands on the exhaust direction d2 side from the injection apparatus 40. Due to the rich region R having expanded on the exhaust direction d2 side, the fuel distribution in the combustion chamber 38 becomes a fuel distribution which facilitates propagation of the flame P to the delay region D.

Figure 11:
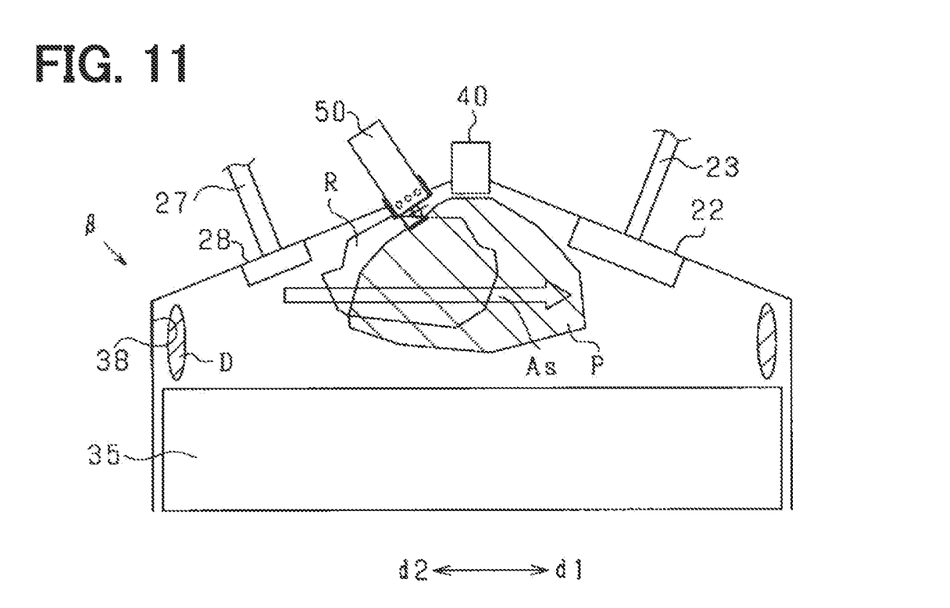
FIG. 11 is a front cross-sectional view illustrating the inside of the combustion chamber immediately after the subsequent ignition.

As illustrated in FIG. 11, when the ignition plug 50 ignites the fuel in the state of this fuel distribution, the rich region R accelerates the propagation of the flame P in the exhaust direction d2 to quickly spread the flame P in the exhaust direction d2. Meanwhile, the spreading of the flame P in the intake direction d1 is slightly retarded compared to that in the normal injection F in the normal control α since the main injection amount is reduced by the sub-injection amount. Consequently, the flame P is likely to evenly spread in the exhaust direction d2 and in the intake direction d1. This suppresses retarded propagation of the flame P to the delay region D. As a result, the self-ignition in the delay region D is suppressed to suppress the occurrence of the knock.

According to the present embodiment, the following effect can be obtained. As in the case in the present embodiment, in the engine 92 in a mode in which the tumble generated in the intake stroke changes to the ω swirl As in the second half of the compression stroke, in the second half of the compression stroke, the delay region D is formed at the end portion on the exhaust direction d2 side in the combustion chamber 38. In this respect, in the present embodiment, the injection apparatus 40 is configured to inject a larger amount of the fuel on the exhaust direction d2 side than on the intake direction d1 side. Therefore, it is possible to form the rich region R on the exhaust direction d2 side by the sub-injection Fs and facilitate efficient propagation of the flame P to the delay region D.

Other Embodiments

Each of the foregoing embodiments can be modified as follows to be implemented. For example, in each of the embodiments, the injection hole 44 has the atomization structure but, alternatively or additionally, the injection hole 44 may also be reduced in size to accelerate the atomization of the fuel, or the sub-injection pressure may also be increased to accelerate the atomization of the fuel.

Also, in each of the embodiments, for example, the adjustment control unit 66 controls the sub-injection pressure such that the sub-injection pressure is higher as the air flow in the combustion chamber 38 is intenser but, alternatively or additionally, the adjustment control unit 66 may also control the sub-injection pressure such that the sub-injection amount is larger as the air flow in the combustion chamber 38 is intenser.

Also, in each of the embodiments, for example, the exhaust determination unit 63 computes the amount of emission of each of CO and PM but, additionally or alternatively, the exhaust determination unit 63 may also compute an amount of emission of $NO_x$ (nitrogen oxide) or $SO_x$ (sulfur oxide). In addition, the exhaust determination unit 63 may also determine that, even when the adjustment control β is performed, the exhaust state falls within the allowable range on the condition that the computed amount of the $NO_x$ or $SO_x$ emission is smaller than a predetermined tolerance threshold.

Also, in each of the embodiments, the electromagnetic sensor 34 is provided on the ignition plug 50, but the electromagnetic sensor 34 may also be provided on the injection apparatus 40, the head 20, the cylinder 30, or the like. Also, in each of the embodiments, for example, the electromagnetic sensor 34 is provided in the combustion chamber 38, but the electromagnetic sensor 34 may also be provided outside the combustion chamber 38. In addition, it may also be possible to provide an optical fiber having one end provided in the combustion chamber 38 and another end extending to the electromagnetic sensor 34 or the like. In other words, it may also be possible to deliver a visible light beam generated in the combustion chamber 38 to an optical sensor (electromagnetic sensor 34) located outside the combustion chamber 38 via the optical fiber.

It is to be construed that, while the present disclosure has been described in accordance with the embodiments, the present disclosure is not limited to the embodiments and structures. The present disclosure encompasses various modifications and variations in the equivalent range. In addition, various combinations and modes, and further, other combinations and modes including only one element thereof, less or more, are intended to fall within the scope and spirit of the present disclosure.

What is claimed is:

1. A combustion system comprising:
   an injection apparatus configured to inject fuel into a combustion chamber of an engine;
   an ignition plug configured to perform ignition on fuel in the combustion chamber; and
   a normal control unit configured to perform a normal control to cause the injection apparatus to perform predetermined normal injection and subsequently to cause the ignition plug to perform the ignition, wherein
   in a predetermined delay region in the combustion chamber, propagation of flame, which is caused by the ignition, is retarded further than in another region when the normal control is performed,
   in a knock state, self-ignition occurs in fuel in the delay region when the normal control is performed,
   the combustion system further comprising:
   a knock determination unit configured to determine whether or not the knock state is established; and
   an adjustment control unit configured to perform, on determination of the knock determination unit that the knock state is established, a predetermined adjustment control to suppress the self-ignition, wherein
the adjustment control is to
cause the injection apparatus to perform predetermined main injection and subsequently perform predetermined sub-injection in a second half of a compression stroke to adjust a fuel distribution in the combustion chamber to facilitate propagation of the flame, which is caused by the ignition, to the delay region further than in the normal injection and
subsequently cause the ignition plug to perform the ignition.

2. The combustion system according to claim 1, further comprising:
a retard control unit configured to perform a retard control in which timing of the ignition is retarded further than in each of the normal control and the adjustment control; and
an exhaust determination unit configured to determine whether or not an exhaust state falls within a predetermined allowable range even when the adjustment control is performed, wherein
the normal control unit is configured to perform the normal control on determination of the knock determination unit that the knock state is not established,
the adjustment control unit is configured to perform the adjustment control on determination of the knock determination unit that the knock state is established and on determination of the exhaust determination unit that the exhaust state falls within the allowable range, and
the retard control unit is configured to perform the retard control on determination of the knock determination unit that the knock state is established and on determination of the exhaust determination unit that the exhaust state does not fall within the allowable range.

3. The combustion system according to claim 2, wherein
the exhaust determination unit is configured to
compute an amount of emission of CO emitted when the adjustment control is performed and
determine that the exhaust state falls within the allowable range on condition that the computed amount of emission of CO is smaller than a predetermined CO tolerance threshold.

4. The combustion system according to claim 2, wherein
the exhaust determination unit is configured to
compute an amount of emission of PM emitted when the adjustment control is performed and
determine that the exhaust state falls within the allowable range on condition that the computed amount of emission of PM is smaller than a predetermined PM tolerance threshold.

5. The combustion system according to claim 1, further comprising:
an electromagnetic sensor configured to detect an electromagnetic wave generated in the combustion chamber, wherein
the adjustment control unit is configured to
detect, based on the detected electromagnetic wave, delay region information, which is related to the delay region, and
perform the adjustment control based on the delay region information.

6. The combustion system according to claim 5, wherein
the electromagnetic sensor is an optical sensor configured to detect a wavelength of chemiluminescence, and
the adjustment control unit is configured to detect the delay region information based on the detected wavelength.

7. The combustion system according to claim 5, wherein
the electromagnetic sensor includes a plurality of electromagnetic sensors, and
the electromagnetic sensors are provided side by side on an outer peripheral surface of the ignition plug to be spaced apart from each other in a circumferential direction.

8. The combustion system according to claim 1, wherein
an intake direction is from an exhaust port of the engine toward an intake port of the engine,
an exhaust direction is opposite to the intake direction,
the engine is configured to sustain, in at least a predetermined state, a tumble generated in an intake stroke until the second half of the compression stroke to form the delay region on a side of the intake direction relative to a center of the combustion chamber, and
the injection apparatus is configured to inject a larger amount of fuel in the intake direction than in the exhaust direction.

9. The combustion system according to claim 1, wherein
an intake direction is from an exhaust port of the engine toward an intake port of the engine,
an exhaust direction is opposite to the intake direction,
the engine is configured to change, in at least a predetermined state, a tumble generated in an intake stroke into an $\omega$ swirl in the compression stroke to form the delay region on a side of the exhaust direction relative to a center of the combustion chamber, and
the injection apparatus is configured to inject a larger amount of fuel in the exhaust direction than in the intake direction.

10. The combustion system according to claim 1, wherein
the adjustment control unit is configured to
control at least one of an injection amount or an injection pressure of the sub-injection based on an intensity of an air flow in the combustion chamber and
increase the at least one of the injection amount or the injection pressure when the intensity of the air flow is higher than a predetermined intensity.

11. The combustion system according to claim 1, wherein
the injection apparatus is provided with an injection hole having an atomization structure to atomize fuel to inject the atomized fuel and
the atomization structure includes at least one of a widening structure, which widens in a tapered form or in a stepwise form in an injection direction, or an oval structure having an oval opening.

12. The combustion system according to claim 1, further comprising:
at least one processor; and
a memory coupled to the at least one processor and storing program instructions that when executed by the at least one processor cause the at least one processor to provide at least: the normal control unit, the knock determination unit, and the adjustment control unit.

13. A combustion system comprising:
an injection apparatus configured to inject fuel into a combustion chamber of an engine;
an ignition plug configured to perform ignition on fuel in the combustion chamber; and
a normal control unit configured to perform a normal control to cause the injection apparatus to perform predetermined normal injection and subsequently to cause the ignition plug to perform the ignition, wherein in a predetermined delay region in the combustion chamber, propagation of flame, which is caused by the ignition, is retarded further than in another region when the normal control is performed, in a knock state, self-ignition occurs in fuel in the delay region when the normal control is performed, the combustion system further comprising:

an electromagnetic sensor configured to detect an electromagnetic wave generated in the combustion chamber; and an adjustment control unit configured to
   detect, based on the detected electromagnetic wave, delay region information, which is related to the delay region, and
   perform a predetermined adjustment control based on the delay region information to suppress the self-ignition, wherein the adjustment control is to
   cause the injection apparatus to perform predetermined main injection and subsequently perform predetermined sub-injection in a second half of a compression stroke to adjust a fuel distribution in the combustion chamber to facilitate propagation of the flame, which is caused by the ignition, to the delay region further than in the normal injection, and
   subsequently cause the ignition plug to perform the ignition.

14. The combustion system according to claim 13, further comprising:

at least one processor; and a memory coupled to the at least one processor and storing program instructions that when executed by the at least one processor cause the at least one processor to provide at least: the normal control unit and the adjustment control unit.

\* \* \* \* \*